United States Patent

Schneider et al.

[11] Patent Number: 5,166,543
[45] Date of Patent: Nov. 24, 1992

[54] CURRENT REGULATING CIRCUIT FOR AN INDUCTIVE LOAD, PARTICULARLY AUTOMATIC TRANSMISSION

[75] Inventors: Claus Schneider, Leinfelden; Karsten-Erik Thiele, Eberdingen-Hochdorf, both of Fed. Rep. of Germany

[73] Assignee: Robert Bosch GmbH, Stuttgart, Fed. Rep. of Germany

[21] Appl. No.: 758,735

[22] Filed: Sep. 12, 1991

[30] Foreign Application Priority Data

Oct. 26, 1990 [DE] Fed. Rep. of Germany ....... 4034081

[51] Int. Cl.$^5$ ............................ H03L 5/00; H03L 3/01; G05F 1/40
[52] U.S. Cl. ........................ 307/264; 307/296.6; 323/288
[58] Field of Search ............... 307/362, 296.6, 264, 307/570, 571, 491; 323/222, 282, 288

[56] References Cited

U.S. PATENT DOCUMENTS

| | | | |
|---|---|---|---|
| 3,436,563 | 4/1969 | Regitz | 307/228 |
| 3,947,776 | 3/1976 | Stevens et al. | 307/491 |
| 4,142,113 | 2/1979 | Lundberg | 307/296.6 |
| 4,251,743 | 2/1981 | Hareyama | 307/296.7 |
| 4,553,082 | 11/1985 | Nesler | 323/288 |
| 4,645,945 | 2/1987 | de Sartre | 307/296.6 |
| 4,672,303 | 6/1987 | Newton | 323/288 |
| 4,716,372 | 12/1987 | Fauser et al. | 328/146 |
| 4,841,166 | 6/1989 | Harnden | 307/491 |
| 4,942,509 | 7/1990 | Shires et al. | 323/288 |
| 5,079,456 | 1/1992 | Kotowski et al. | 307/571 |

Primary Examiner—Janice A. Howell
Assistant Examiner—Toan Tran
Attorney, Agent, or Firm—Frishauf, Holtz, Goodman & Woodward

[57] ABSTRACT

A current regulating circuit for an inductive load (12) is proposed, in particular for an electrohydraulic pressure regulator for an automatic transmission of a motor vehicle. A push-pull end stage (16) controls the flow of current through the load (12). Connected in series with the load (12) is a measuring resistor (11), the voltage drop of which, as an actual current value, is applied along with a command current value to a comparison stage (23, 34), by the clocked output signal of which the end stage (16) can be controlled. The measuring resistor (11) is disposed between the load (12) and a first switch transistor (10) of the end stage (16). The potential at one of the pickups (19, 20) of the measuring resistor (11) is provided as a variable reference potential for an auxiliary voltage source (31) supplying the comparison stage (23, 34), which source has switch means (40) for generating an auxiliary voltage (Uh) that is constant relative to the variable reference potential. By means of this integratable and hence economical arrangement, only a few external components and no external calibration are necessary. Nevertheless, high precision is assured, over a wide temperature range that depends essentially on the precision of the measuring resistor (11) and on the precision of the analog command value present via the resistor (30).

12 Claims, 1 Drawing Sheet

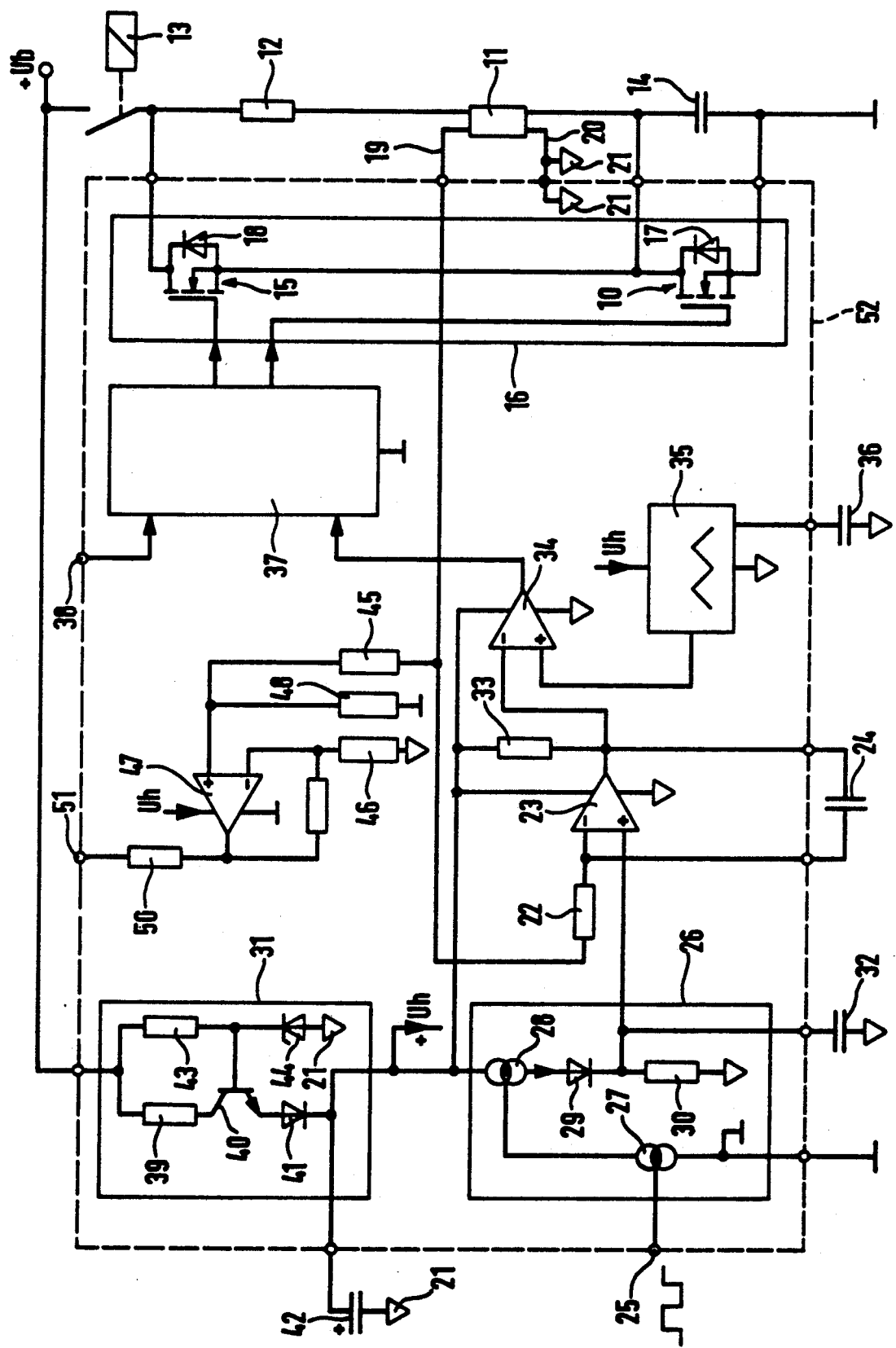

CURRENT REGULATING CIRCUIT FOR AN INDUCTIVE LOAD, PARTICULARLY AUTOMATIC TRANSMISSION

The invention relates to a current regulating circuit for an inductive load or "consumer", in particular an electrohydraulic pressure regulator for an automatic automobile transmission.

BACKGROUND

For many applications, it is presently necessary to regulate the current through an inductive load very exactly. For instance, with clocked control of an end stage for an electrohydraulic pressure regulator of an automatic transmission, the arithmetic mean value for the current must be regulated very precisely, so that the hydraulic pressure produced can likewise be adjusted exactly. This exact adjustment is important, not least to provide for easy shifting of the automatic transmission. Such precise regulation of the arithmetic mean value of the current for inductive loads is also desirable and necessary in other fields, for instance for controlling valves in suspension system adjustment or in anti-skid braking systems in motor vehicles.

In known current regulating circuits for this purpose, the accuracy is often inadequate, or the circuitry is overly complex and expensive; typically, external calibration is necessary to adjust the desired values and compensate for temperature factors. Besides the measuring resistor, a great number of other precision resistors and precision components are needed. This makes the current regulating circuit more complex and expensive, and it can be integrated with difficulty if at all; thus, the known current regulating circuits are typically formed either as discrete components or as hybrid circuits. The required calibration to attain adequate accuracy increases the expense.

THE INVENTION

The current regulating circuit according to the invention as defined hereinafter has the advantage of making integration possible, resulting in a small component at favorable cost that moreover no longer requires external calibration. The precision of the externally connectable measuring resistor and the precision of the command value, which is prepared in analog form, assure the precision of the regulated arithmetic mean value for the current. High precision is attainable in a simple manner over a temperature range from −40° C. to +110° C. Because of the variable reference potential and the fact that the voltage drop is picked up directly at the measuring resistor, influences such as temperature factors and voltage drops through feed lines can be kept from affecting the measurement. Although detecting the current in the inductive load by direct pickup of the voltage drop at the measuring resistor requires increased complexity and expense, since essentially all the active components must be acted upon by the variable reference potential, nevertheless this expense is negligible when the current regulating circuit is integrated.

The end stage is suitably formed as a push-pull end stage; a second switch transistor is disposed in a free-running circuit for the load.

By using MOSFETs (Metal Oxide Semiconductor Field Effect Transistors) as the switch transistors of the end stage, the end stage can also be integrated with the rest.

To obtain a clocked signal train for triggering the push-pull end stage, the duty cycle of which depends on the control deviation, the comparison stage has a comparator that compares the output signal train of an oscillator, which generates a delta voltage, with a signal dependent on the control deviation; the oscillator is supplied by the auxiliary voltage source. The comparator output is suitably connected to the end stage via a driver stage provided with a level converter for the sake of level adaptation. The capacitor that specifies the frequency of the oscillator can advantageously be disposed outside the integrated circuit, in the form of an external component, to enable free adjustment of the oscillator frequency.

To attain a control deviation signal to trigger the comparator in cases where the command value of the current is clocked, the comparison stage has an integrator to form the control deviation; the actual and command values, respectively, are applied to the two inputs of the integrator. The integrator input acted upon by the command value of the current is applied to the variable reference potential via a capacitor.

To adapt the level of the command current value not coupled to the variable reference potential, which value is present in the form of a signal train of variable duty cycle, this signal train is delivered to the integrator via a level converter, and the level converter is acted upon by the auxiliary voltage source. To make it possible for the current through the inductive load to be ascertained from an external control unit, the two measurement pickups of the measuring resistor are connected to a subtractor-amplifier, which is supplied with the auxiliary voltage and at the output of which a status signal that can be picked up externally is formed.

To increase the measurement accuracy, the measuring resistor has separate measuring terminals, for four-point measurement.

A simple and practical embodiment of the auxiliary voltage source provides that it has a capacitor connected to the variable reference potential and supplied via the switching path of a transistor from a supply voltage source; to control the base of the transistor, a Zener diode connected to the variable reference potential is acted upon by the supply voltage source, and the capacitor voltage produces the auxiliary voltage.

DRAWING

One exemplary embodiment of the invention is shown in the drawing and described in further detail below. The sole figure of the drawing shows a circuit diagram of the exemplary embodiment of the current regulating circuit, partly in the form of a block diagram.

DETAILED DESCRIPTION

The series circuit of the switching path of a first power transistor 10 having a current measuring resistor 11, an inductive load 12 and the switching path of a shutoff relay 13 is connected between the positive pole of a supply voltage source Ub and ground. A capacitor 14 is connected parallel to the switching path of the first power transistor 10, which in turn is connected to ground by one terminal. The series circuit of the current measuring resistor 11 and the inductive load 12 is bypassed by the switching path of a second power transistor 15. The two power transistors 10, 15 form a push-pull end stage 16 and are formed as n-channel MOSFETs; the switching paths of which are each bypassed by diodes 17, 18 that are required for technical reasons.

The shutoff relay 13 may be controlled by an electronic control unit, not shown, and serves the purpose of emergency shutoff or shutoff if malfunctions arise. The current measuring resistor 11 is formed as a so-called four-point measuring resistor and has separate pickups 19, 20 for the measured voltage, so that temperature factors and voltage drops through the current-carrying lines will not be taken into account.

The capacitor 14 serves as a protective and buffer capacitor for the transition phase in the push-pull switchover of the two power transistors 10, 15. In an integrated version of these power transistors, this capacitor 14 may also be omitted. It is also possible in principle to use other types of known power transistors for the push-pull end stage 16.

The inductive load 12, the current flowing through which is to be regulated exactly, is for instance a component of an electrohydraulic pressure regulator to regulate the hydraulic pressure in automatic transmissions. In some other version, this inductive load 12 may also be formed as a control valve for a vehicle suspension control system or an anti-skid braking system for motor vehicles. Its use is appropriate wherever a very exact regulation of the arithmetic mean value for the current flowing through is to be attained.

While the pickup 20 of the current measuring resistor 11 specifies a variable reference potential 21, the pickup 19 is carried via a resistor 22 to the inverting input of an integrator 23, which is formed as an operational amplifier. The electrical signal supplied via the pickup 19 is the actual value of the current flowing through the inductive load 12. In order for the operational amplifier to be wired as an integrator 23, its output is fed back via a capacitor 24 to the inverting input.

A command current value that can be applied to an input 25 comprises a signal train with a suitably variable duty cycle and is delivered on the input side to a level converter 26. There it controls the flow of current of a first current source 27, connected at one end to ground. The series circuit of a second current source 28, a diode 29 and a resistor 30 is connected between the positive pole of an auxiliary voltage source 31 and the variable reference potential 21. The auxiliary voltage source 31 generates the auxiliary voltage Uh. The current flow through the second current source 28 is controlled by the first current source 27. Connected parallel to the resistor 30 is a capacitor 32, at which an analog command value of the current is present; this value is dependent on the digital command value at the input 25 and is delivered to the non-inverting input of the integrator 23.

The integrator 23 weights the actual and command values for the current and at its output furnishes a variable direct voltage, which represents a measure for the control deviation. The output of the integrator 23 is acted upon via a resistor 33 by the auxiliary voltage Uh and is connected to the inverting input of a comparator 34, likewise formed as an operational amplifier. The output voltage of a free-oscillating oscillator 35, which is formed as a delta voltage, is delivered to the non-inverting input of the comparator 34, where this delta voltage is compared with the direct voltage, corresponding to the control deviation, at the output of the integrator 23. An external capacitor 36 at the oscillator 35 serves to adjust the oscillator frequency. The integrator 23 together with the comparator 34 forms a comparison stage.

The signal train generated at the output of the comparator 34, the duty cycle of which is a function of the control deviation, controls a driver stage 37, shown only schematically, which is controlled to the input side of the push-pull end stage 16. This driver stage 37 is embodied like a typical driver stage for a push-pull end stage and in the present case also includes the necessary level converter for adaptation of the output side train of the comparator 34, referred to the variable reference potential, to the voltage of the end stage 16, which is referred to ground. The level conversion can for instance be effected in accordance with the level converter 26. The driver stage 37 also has a blocking input 38, to enable blocking the driver stage 37 or the end stage 16 by means of a signal of an external control unit. A blocking signal of this kind typically acts upon the base of a transistor of the driver stage 37 that effects the blockage.

In the auxiliary voltage source 31, the series circuit of a resistor 39 and the switching path of a transistor 40 and a diode 41 is connected on the one hand to the positive pole of the supply voltage Ub and on the other, via a capacitor 42, to the variable reference potential 21. The base of the transistor 40 is connected on the one hand to the positive pole of the supply voltage Ub, via a resistor 43, and on the other to the variable reference potential 21, via a Zener diode 44.

The auxiliary voltage source 31 generates a constant output voltage Uh, referred to the variable reference potential. If the variable reference potential varies because of a switchover of the power transistor 10, then the positive pole of the auxiliary voltage Uh varies accordingly with it. This is achieved by providing that the transistor 40 blocks if the variable reference potential rises, or in other words if the power transistor 10 is blocked, and the capacitor 42 buffers the current supply to the regulating circuit. In the reverse case, the transistors 10 and 40 are conducting, so that a corresponding adaptation of the absolute voltage at the positive pole of the auxiliary voltage is effected with respect to ground. The auxiliary voltage Uh is present at the capacitor 42, or can be picked up there.

The two pickups 19, 20 of the current measuring resistor 11 are each connected via a respective resistor 45, 46 to the two inputs of a subtractor-amplifier 47 formed as an operational amplifier. The non-inverting input, connected to the resistor 45, of the subtractor-amplifier 47 is still connected to ground, via a resistor 48. A resistor 49 serves to provide feedback of the output to the inverting input. The output voltage of the subtractor-amplifier 47 is applied to an output 51, via a resistor 50.

By means of the subtractor-amplifier 47, a signal dependent on the voltage drop at the current measuring resistor 11 and thus on the current through the inductive load 12 is formed, which can be picked up at the output 51 by an external control unit. This signal can for instance be used to monitor the flow of current through the inductive load 12, and if limit values are exceeded it can serve to shutoff the current, via the blocking input 38 or the shutoff relay 13.

An essential feature of the current regulating circuit shown and described here is that virtually all the voltages that arise are referred to the variable reference potential at the current measuring resistor 11, which viewed in absolute terms changes as a function of the switch status of the first power transistor 10 between the ground potential and a substantially higher potential. The auxiliary voltage source 31 generates an auxiliary voltage, which is based on the various reference potential and varies with it, while the absolute value of the auxiliary voltage Uh remains constant. This auxiliary voltage serves to supply voltage to the active components involved, in other words the second current source 28, the integrator 23, the comparator 34, the oscillator 35, and the subtractor-amplifier 47. The capacitors 32, 36 and 42 are also applied to this variable reference potential, so that their respective voltages are likewise based on this variable reference potential. This prevents voltage drops on lines and otherwise necessary resistors, which could lead to adulteration of the outcome of measurement and to a dependency on temperature factors. Accordingly, calibration of such resistors is no longer necessary.

The current regulating circuit described, including the push-pull end stage 16, can be realized in a single integrated circuit 52; in that case, only the capacitors 14, 24, 32, 36 and 42, the current measuring resistor 11 and the inductive load 12 remain as external wiring. The output clock frequency of the oscillator 35 is freely selectable within wide limits because of the capacitor 36. Via the capacitor 32, the dynamics of regulation can be varied. As already noted, the capacitor 14 may also be dispensed with in the event of monolithic integration of the two power transistors 10 and 15. The entire current regulating circuit represents a closed control loop, which in principle may also be replaced with special circuits of other known regulating circuits, but it remains a core feature of the present invention that the various voltages and voltage supplies are based on the variable reference potential at the current measuring resistor 11.

In an alternative embodiment, the inductive load 12 may for instance also be connected to ground and may be connected via the current measuring resistor 11 to a linking point between the two power transistors 10 and 15.

Various changes and modifications may be made, and features described in connection with any one of the embodiments may be used with any of the others, within the scope of the inventive concept.

We claim:

1. A circuit for precisely regulating current through an inductive load, having
    means (25) for inputting a variable-duty-cycle clock signal representing a command value for said current through said load,
    means (11, 19, 20) for measuring an actual value of current through said load (12),
    a comparison stage (23, 34), having a pair of inputs respectively receiving said command value and said actual value, and generating an output control signal representative of deviation between said command value and said actual value, and
    a push-pull end stage (16) responding to said deviation signal and controlling the flow of current through the load (12) by means of first (10) and second (15) switching transistors,
    wherein,
    said means for measuring comprises a measuring resistor (11) connected in series with between said load and ground, a first voltage pickup (19) on a load-adjacent side of said resistor (11), and a second voltage pickup (20) on a ground-adjacent side of said resistor (11), said second voltage pickup furnishes a variable reference potential,
    said first voltage pickup (19) is connected to one of said inputs of said comparison stage (23, 34), thereby furnishing an actual current value, and said circuit further comprising
    an auxiliary voltage source (31), having an input connected to said second voltage pickup (20), and an output connected to said comparator stage (23, 34), thereby furnishing said stage with an auxiliary voltage ($U_h$) which tracks said variable reference potential.

2. The current regulating circuit of claim 1, wherein
    said first switching transistor (10) is connected with its emitter-collector path in series between said measuring resistor (11) and ground, and
    said second switching transistor (15) is connected with its emitter-collector path in parallel to said series-connected measuring resistor (11) and load (12).

3. The current regulating circuit of claim 1, characterized in that
    MOSFETs (Metal Oxide Semiconductor Field Effect Transistors) are used for the switching transistors (10, 15) of the end stage (16).

4. The current regulating circuit of claim 2, characterized in that
    MOSFETs (Metal Oxide Semiconductor Field Effect Transistors) are used for the switching transistors (10, 15) of the end stage (16).

5. The current regulating circuit of claim 1, characterized in that
    the auxiliary voltage source (31) has a capacitor (42), which is connected to the variable reference potential, said capacitor being supplied by a supply voltage source (Ub) via the switching path of a transistor (40), and
    that for controlling the base of transistor (40), a Zener diode (44) acted upon by the supply voltage source and located at the variable reference potential is provided, wherein the voltage across said capacitor is the auxiliary voltage (Uh).

6. The current regulating circuit of claim 1, wherein
    a driver stage (37) is provided, having an input connected to said deviation signal of said comparator stage, and a pair of outputs, connected respectively to the base of said first switching transistor (10) and to the base of said second switching transistor (15).

7. The current regulating circuit of claim 1, characterized in that
    the comparison stage (23, 34) has an integrator (23) for forming the deviation signal, said integrator having two inputs to which are applied the actual current value and the command value.

8. The current regulating circuit of claim 7, characterized in that
    the command value, present in the form of a signal train with a variable duty cycle, is delivered via a level converter (26) to the integrator (23), and the level converter (26) is actuated upon by the auxiliary voltage source (31).

9. The current regulating circuit of claim 7, characterized in that
    the input of the integrator (23) acted upon by the command value is applied to the variable reference potential via a capacitor (32).

10. The current regulating circuit of claim 8, characterized in that
    the input of the integrator (23) acted upon by the command value is applied to the variable reference potential via a capacitor (32).

11. The current regulating circuit of claim 1, characterized in that
the two voltage pickups (19, 20) of said means for measuring (11) are connected to a subtractor-amplifier (47) supplied by the auxiliary voltage (Uh), said subtractor-amplifier having an output which provides a status signal that can be picked up externally.

12. The current regulating circuit of claim 7, characterized in that
the comparison stage (23, 34) has a comparator (34) comparing said deviation signal with an output signal train of an oscillator (35), the oscillator (35) being supplied by the auxiliary voltage source (31).

* * * * *